United States Patent
Kaplan et al.

(10) Patent No.: US 10,176,122 B2
(45) Date of Patent: Jan. 8, 2019

(54) DIRECT MEMORY ACCESS AUTHORIZATION IN A PROCESSING SYSTEM

(71) Applicants: Advanced Micro Devices, Inc., Sunnyvale, CA (US); ATI TECHNOLOGIES ULC, Markham (CA)

(72) Inventors: David Kaplan, Austin, TX (US); Maggie Chan, Markham (CA); Philip Ng, Markham (CA)

(73) Assignees: Advanced Micro Devices, Inc., Santa Clara, CA (US); ATI Technologies ULC, Markham (CA)

( * ) Notice: Subject to any disclaimer, the term of this patent is extended or adjusted under 35 U.S.C. 154(b) by 121 days.

(21) Appl. No.: 15/297,868

(22) Filed: Oct. 19, 2016

(65) Prior Publication Data
US 2018/0107608 A1    Apr. 19, 2018

(51) Int. Cl.
| | | |
|---|---|---|
| G06F 11/30 | (2006.01) | |
| G06F 12/14 | (2006.01) | |
| G06F 3/06 | (2006.01) | |
| G06F 9/455 | (2018.01) | |
| G06F 13/28 | (2006.01) | |

(52) U.S. Cl.
CPC ........ *G06F 12/1466* (2013.01); *G06F 3/0622* (2013.01); *G06F 3/0659* (2013.01); *G06F 3/0673* (2013.01); *G06F 9/45558* (2013.01); *G06F 13/28* (2013.01); *G06F 2009/45583* (2013.01); *G06F 2212/1052* (2013.01); *G06F 2212/402* (2013.01)

(58) Field of Classification Search
CPC ............... G06F 12/1466; G06F 12/145; G06F 12/1408; G06F 12/1081; G06F 12/1036; G06F 2009/4557; G06F 21/10; G06F 21/602
USPC ........................................................ 713/193
See application file for complete search history.

(56) References Cited

U.S. PATENT DOCUMENTS

| | | | | |
|---|---|---|---|---|
| 8,631,212 B2 * | 1/2014 | Kegel | ................. | G06F 12/1081 711/152 |
| 2008/0005495 A1 * | 1/2008 | Lowe | ................. | G06F 12/1081 711/152 |
| 2012/0072619 A1 | 3/2012 | Tsirkin et al. | | |
| 2013/0080726 A1 * | 3/2013 | Kegel | ................. | G06F 12/1081 711/163 |

(Continued)

OTHER PUBLICATIONS

International Search Report and Written Opinion for PCT Application No. PCT/US2017/057005, 15 pages.

*Primary Examiner* — Samson B Lemma

(57) ABSTRACT

A processor employs a hardware encryption module in the memory access path between an input/out device and memory to cryptographically isolate secure information. In some embodiments, the encryption module is located at a memory controller of the processor, and each memory access request provided to the memory controller includes VM tag value identifying the source of the memory access request. The VM tag is determined based on a requestor ID identifying the source of the memory access request. The encryption module performs encryption (for write accesses) or decryption (for read accesses) of the data associated with the memory access based on an encryption key associated with the VM tag.

20 Claims, 5 Drawing Sheets

(56) References Cited

U.S. PATENT DOCUMENTS

| | | |
|---|---|---|
| 2014/0068137 A1 | 3/2014 | Kegel et al. |
| 2015/0248357 A1* | 9/2015 | Kaplan .............. G06F 12/1408 |
| | | 713/193 |
| 2016/0224496 A1 | 8/2016 | Bayer et al. |

* cited by examiner

DIRECT MEMORY ACCESS AUTHORIZATION IN A PROCESSING SYSTEM

BACKGROUND

Description of the Related Art

In many processor applications, protection of information security is an important feature. For example, a processor can be used in a server in an Infrastructure As A Service (IAAS) environment, wherein the processor executes one or more virtual machines (VMs) and executes a hypervisor to partition the server hardware among the VMs and isolate the VMs from each other. Because different VMs may be executed on behalf of different customers, it is desirable that the information (instructions and data) employed by each VM be protected from access by other VMs. Conventionally, the hypervisor maintains isolation of VM information by maintaining separate memory page tables and other logical entities for each VM. However, flaws (e.g., bugs) in the hypervisor can cause the hypervisor itself to be vulnerable to exploitation, allowing one VM to access the information of another VM. Even in more private security environments, such as a personal computer, data stored in memory modules can be subject to theft, and the data stored therein subject to unauthorized access. In some security environments, direct memory access (DMA) from a device to secure memory spaces is not trusted due to difficulties in identifying the initiator of the DMA request. For example, an unauthorized entity could access secure memory spaces by requesting DMA via unauthorized devices.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

FIGS. 1-5 illustrate techniques for protecting secure information at a processing system by employing a hardware encryption module in the processor's memory access path to cryptographically isolate the secure information. A processor employs the hardware encryption module in the memory access path between an input/output device and memory to cryptographically isolate secure information. In some embodiments, the encryption module is located at a memory controller of the processor, and each memory access request provided to an input/output memory management unit (IOMMU) at the processor includes a requestor ID value identifying the source of the memory access request. In some embodiments the processor is employed in a processing system to execute different virtual functions (VFs) on an input/output (IO) device. For example, in some embodiments, the encryption module stores a unique key for each VF executing on an IO device. In some scenarios, the keys for the VF can be generated by a security module separate from processor cores of the processing system, so that software executing at the processor cores, including the hypervisor, cannot access the keys. In response to receiving a DMA request at the IOMMU, the source of the requestor VF is identified based on a requestor ID value included with the memory access request. The requestor ID value is used by the IOMMU to look up a VM TAG value associated with the requestor VF using a device table. The VM TAG value identifies the particular encryption key that should be used with the DMA request to encrypt data written to memory or decrypt data read from memory.

In some embodiments, the techniques described herein are implemented in a processing system employed in a physically insecure environment, wherein the processing system's memory is subject to unauthorized physical access (e.g., theft of hardware memory modules or physical probing of the memory). However, because the encryption module causes secure data to be stored at the memory in encrypted form, the secure data is not readily useful even if it is subject to unauthorized physical access. To illustrate, even if an authorized VF were to attempt a DMA request to retrieve data stored at a memory location assigned to another VM/VF, the data would be accessed with an incorrect encryption key, resulting in the incorrect key being used for encryption/decryption (i.e., the true plaintext/cleartext of the data is not returned in response to the memory access).

Figure 1:
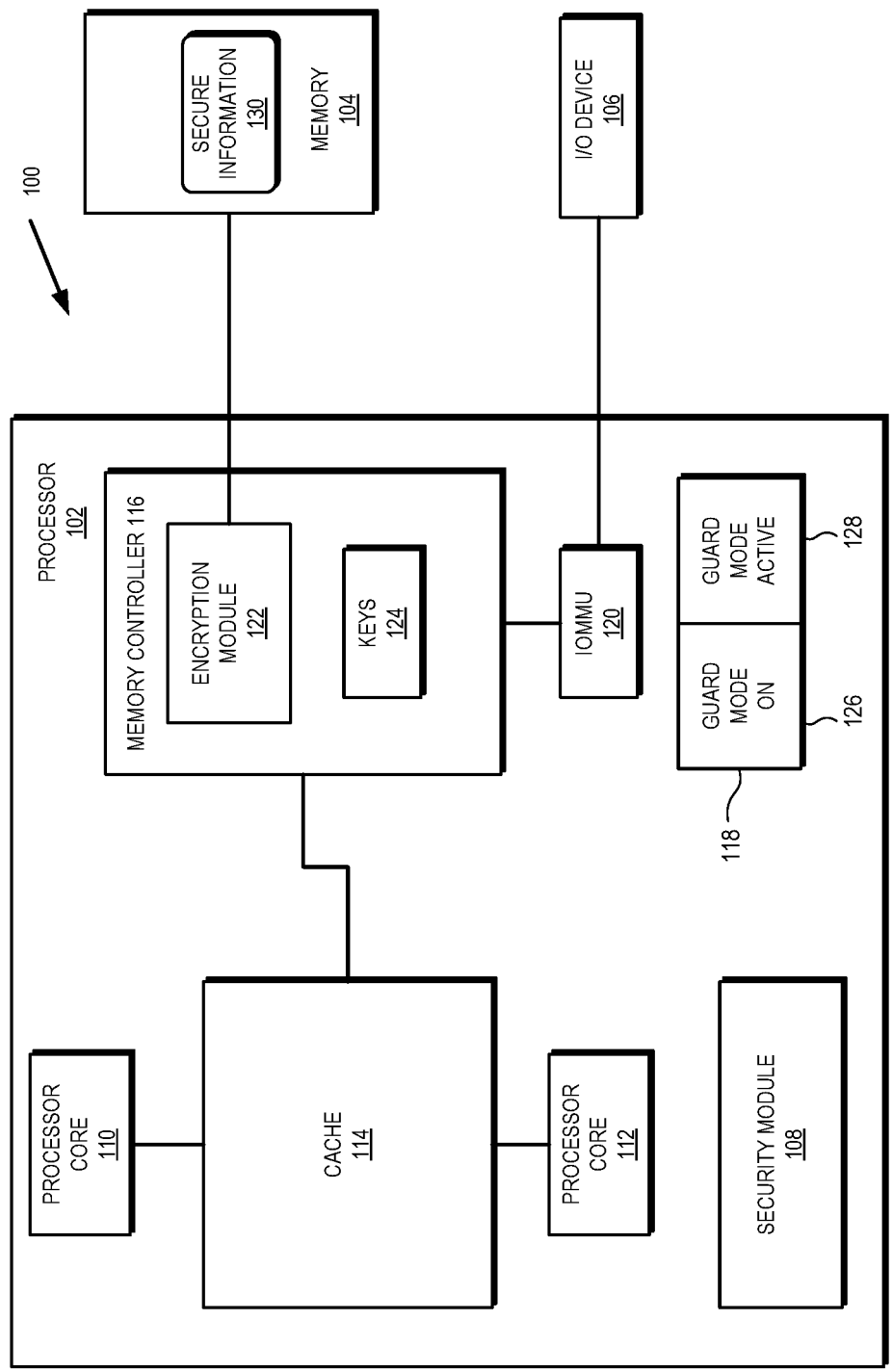
FIG. 1 is a block diagram of a processing system employing an encryption module at a memory controller for secure isolation of information in accordance with some embodiments.

FIG. 1 illustrates a processing system 100 that provides for cryptographic protection of information in accordance with some embodiments. The processing system 100 includes a processor 102 and a memory 104. The processing system 100 can be incorporated in any of a variety of electronic devices, such as a server, personal computer, tablet, set top box, gaming system, and the like. The processor 102 is generally configured to execute sets of instructions (e.g., computer programs) that manipulate the circuitry of the processor 102 to carry out defined tasks. The memory 104 facilitates the execution of these tasks by storing data used by the processor 102. The memory 104 can be random access memory (RAM), non-volatile memory such as flash memory or a hard disk drive (HDD), and the like, or a combination thereof. The processing system 100 also includes a physical input/output (I/O) device 106. The physical I/O device 106 can be, for example, a network interface card (NIC), a host bus adapter (HBA), or the like.

The processor 102 includes a security module 108. The security module 108 is a general purpose processor, field programmable gate array (FPGA), application specific integrated circuit (ASIC), mode of operation of a processor core, or other module designed and configured to perform security operations for the processing system 100, including registration of entities (e.g., virtual machines, computer programs, and the like) to be executed at the processor 102, generation and identification of security keys for the entities to be executed, authentication of the processing system 100 for security operations, and the like. In some embodiments, the security module 108 may undergo a secure registration process before it is permitted to execute its operations, and may have its operations restricted to security operations only, so that it cannot execute operations that leave it vulnerable to exploitation. As described further herein, the security module 108 supports the cryptographic isolation of information at the processing system 100 by generating security keys, identifying the entities registered to be executed at the processing system 100, and other operations that enable such cryptographic isolation.

The processor 102 also includes processor cores 110 and 112, a cache 114, a memory controller (e.g., a northbridge) 116, and a security mode register 118. The processor cores 110 and 112 are processing units that individually and concurrently execute instructions. In some embodiments, each of the processor cores 110 and 112 includes an individual instruction pipeline that fetches instructions, decodes the fetched instructions into corresponding operations and, using the resources of the processing system 100, executes various operations. The processor 102 also includes an input/output memory management unit (IOMMU) 120 that is used to connect devices (such as the I/O device 106 shown in FIG. 1) to the memory controller 116.

In some embodiments, the processing system 100 implements a security scheme whereby the security designation for information (whether the information is to be cryptographically protected) is assigned based on control bits included with the memory address corresponding to where the information is stored at the memory 104 or corresponding to the type of information (e.g., instructions or data). This allows large collections of data to be easily classified as secured information, providing for efficient information protection. For example, in some embodiments, the control bits are set by the processing system 100 so that particular types of information, such as instruction information, or page table information that provides a mapping of virtual addresses to physical addresses of the memory 104, are designated as secured information, thereby cryptographically protecting this information. The control bits for addresses assigned to data can be designated in a more fine-grained fashion based on, for example, designations requested by programs executing at the processor 102. This security scheme provides for protection of crucial data (preventing, for example, unauthorized execution of a virtual machine or its programs) while still providing flexibility for more general data.

In some embodiments, because the security type assigned to information is designated based on the information's corresponding memory address, the processing system 100 uses the page tables themselves to indicate the security type for each memory address. Accordingly, as described further below, the IOMMU 120 identifies the type of memory access request in the course of identifying the memory address corresponding to the memory access request. In particular, if the memory address is indicated as storing secured information, the corresponding memory access is identified as a secure memory access. Similarly, if the memory address is indicated as storing non-secured information, the corresponding memory access is identified as a non-secure memory access.

The memory controller 116 provides an interface for the I/O device 106 to communicate with the memory 104. The IOMMU 120 receives memory access requests (e.g., direct memory access requests) from the I/O device 106 and controls provision of those requests to the memory 104 via memory controller 116. In addition, the memory controller 116 receives responses to memory access requests from the memory 104 and controls provision of the responses to the I/O device 106.

To provide for cryptographic isolation of information, the memory controller 116 includes an encryption module 122 configured to encrypt and decrypt information according to a specified cryptographic standard, and based on keys 124. In some embodiments, the encryption module 122 is configured to employ Advanced Encryption Standard (AES) encryption and decryption, but in other embodiments the encryption module 122 may employ other encryption/decryption techniques.

The memory controller 116 is configured to identify each memory access request as one of two types: a secure memory access request, indicating that the information corresponding to the memory access request is designated for cryptographic protection, or a non-secure memory access request, indicating that the information corresponding to the memory access request is not designated for cryptographic protection. In response to receiving a write request, the memory controller 116 identifies whether the request is a secure memory access request or a non-secure memory access request. If the write request is a non-secure memory access request, the memory controller 116 bypasses the encryption module 122 and provides the write request to the memory 104 without encrypting the information to be written. If the write request is a secure memory access request, the memory controller 116 identifies one of the keys 124 that is assigned to the I/O device 106 that generated the memory access request. In some embodiments, the memory controller 116 identifies and selects the key based on an identification tag value (i.e., VM TAG), as further described herein, assigned to the I/O device 106. The encryption module 122 employs the selected key to encrypt the information to be written and provides the write request, with the encrypted information, to the memory 104 for storage. In some embodiments, the encryption module 122 uses both the selected key and the physical address of the memory access request for encryption and decryption of the corresponding information thereby preventing block move attacks. In some embodiments, the encryption module 122 identifies whether to use the physical address for encryption and decryption based on the state of a control bit (not shown) at the processor 102. The control bit state can be set by the security module 108.

In response to receiving a read request, the memory controller 116 provides the request to the memory 104 and subsequently receives the information responsive to the request. If the memory controller 116 identifies the read request as a non-secure memory access request, it bypasses the encryption module 122 and provides the read information to the I/O device 106 without encryption. If the memory controller 116 identifies the read request as a secure memory access request, it identifies one of the keys 124 that is assigned to the I/O device 106 that generated the read access request and the encryption module 122 decrypts the read information. The memory controller 116 then provides the decrypted read information to the I/O device 106.

In some embodiments, the security mode register 118 is employed to control operation of the encryption module 122. The security mode register 118 includes a guard-mode-on field 126 and a guard-mode-active field 128. In response to the guard-mode-on field 126 being in a specified state (e.g., a negated state), the memory controller 116 bypasses the encryption module 122 for all memory access requests, including secure memory access requests. This allows the processing system 100 to operate in a mode where encryption and decryption are bypassed for all programs being executed at the processor 102 and at the I/O device 106.

In response to the guard-mode-on field 126 being in a different specified state (e.g., an asserted state), the memory controller 116 identifies a state of the guard-mode-active field 128. In response to the guard-mode-active field 128 being in a specified state (e.g., a negated state) the memory controller 116 bypasses the encryption module 122 for received memory access requests (including secure memory access requests) and, in response to the guard-mode-active field 128 being in a different state (e.g., an asserted state) bypasses the encryption module 122 only for non-secure memory access requests. In some embodiments, the guard-mode-on field 126 is set by an entity (e.g., a hypervisor) managing the execution of multiple individual programs or entities (e.g., VMs) at the processor 102 while the guard-mode-on field 126 is set individually for each of the individual programs or entities. The security mode register 118 thus allows the use of the encryption module 122 to be controlled at different levels of granularity.

In some embodiments, the I/O device 106 may employ the memory controller 116 to access secure information 130 in the memory 104 through direct memory access (DMA) requests by initiating a memory access request containing a virtual address sent to the IOMMU 120. The IOMMU 120 may perform address translation between device virtual addresses used by the I/O device 106 and physical addresses in the memory 104. For example, the I/O device 106 generates memory access requests, including write requests to store data at the memory 104 and read requests to retrieve data from the memory 104. Each memory access request includes a memory address indicating a location at the memory 104 targeted by the memory access request. In response to a read request, the memory 104 retrieves information (data or instructions) stored at the location corresponding to the memory address of the read request and provides the information to the I/O device 106. In response to a write request, the memory 104 stores write information of the request at the location corresponding to the memory address of the write request.

Further, the encryption module 122 performs encryption (for write accesses) or decryption (for read accesses) of the data associated with the memory access requests. For secure memory accesses, the encryption module 122 performs encryption (for write accesses) or decryption (for read accesses) of the data associated with the memory access. Because the encryption is done by hardware in the processor's memory access path, the data stored at the memory 104 is not meaningfully accessible without the correct encryption/decryption key, as described further below.

Figure 2:
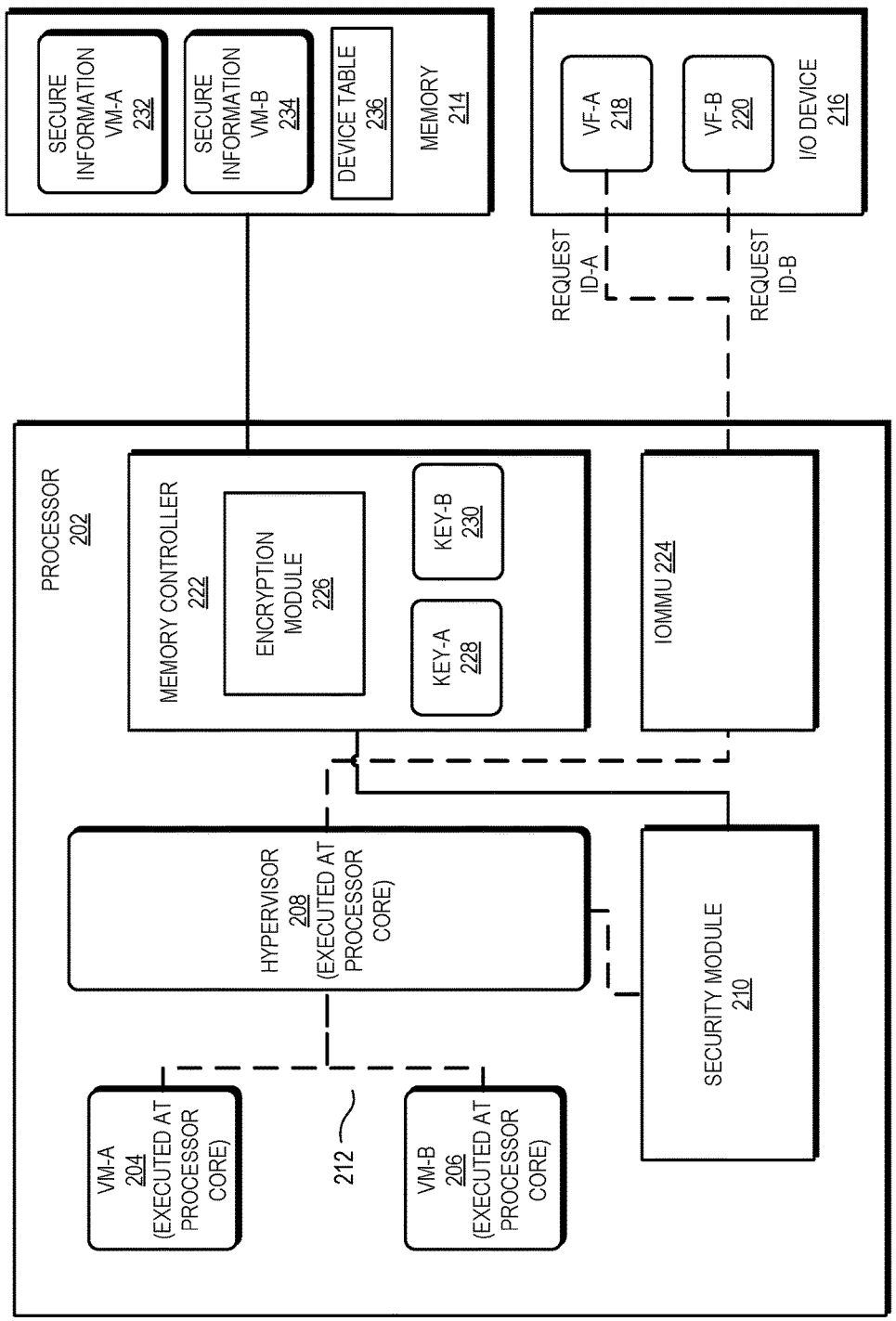
FIG. 2 is a block diagram illustrating an example implementation of the processing system of FIG. 1 to provide for isolation of information in accordance with some embodiments.

FIG. 2 illustrates, in accordance with some embodiments, an example operation of FIG. 1's processing system 100. The processor 202 is to concurrently execute two virtual machines (VMs), VM-A 204 and VM-B 206. In addition, the processor 202 executes a hypervisor 208 to provide an interface between the VMs 204, 206 and the hardware of the processing system. In operation, prior to being permitted to execute at the processor 202, each of the VMs 204 and 206 register with the security module 210. In some embodiments, a VM is registered as follows: the VM owner establishes a secure communication channel 212 with the security module 210. An identification tag value, designated a "VM TAG" and a security key, designated a "VM KEY", are generated for the VM. This generation can be done at the security module 210 or at a separate security device and communicated to the security module 210 via the secure communication channel 212. In some embodiments, the VM TAG value for each VM is written initially by the hypervisor 208 and provided to the security module 210 to be encrypted. The security module 210 ensures that each of the VM KEY and VM TAG values are unique to the corresponding VM. The VM owner encrypts an image of the corresponding VM and provides it to the hypervisor 208, which stores the encrypted image as secure data at the memory 214 (for example, at secure information spaces 232 and 234).

The hypervisor 208 assigns each VM to a corresponding encrypted address space for the VM. The secure information 232 includes the VM image for VM-A 204 and the secure information 234 includes the VM image for VM-B 206. The memory 214 stores data used by the processor 202. The memory 214 can be random access memory (RAM), non-volatile memory such as flash memory or a hard disk drive (HDD), and the like, or a combination thereof.

The processing system also includes a physical input/output (I/O) device 216. The physical I/O device 216 can be, for example, a network interface card (NIC), a host bus adapter (HBA), or the like. The I/O device 216 can include a plurality of virtual functions (VFs) that are configured on the device. For example, the I/O device 216 includes two VFs, VF-A 218 and VF-B 220, that are configured on the device. The hypervisor 208 maps (e.g., assigns) the VFs 218, 220 to the VMs 204, 206. For example, VF-A 218 is mapped to VM-A 204 and VF-B 220 is mapped to VM-B 206. Further, the security module 210 associates the VMs with the I/O device VFs by assigning a unique identification tag value (e.g., the VM TAG) to each VF. This configuration provides a path from the VMs to the registers of the I/O device 216 via the IOMMU 224 and ensures that only authorized VMs can reach the registers of their associated VFs. For example, VM-A TAG is associated with VF-A 218 and VM-B TAG is associated with VF-B 220 in a device table 236 residing within the memory 214.

An IOMMU 224 is used to connect devices (such as the I/O device 216) to the memory controller 222. The IOMMU 224 provides an interface for the I/O device 216 to communicate with the memory 214. The memory controller 222 receives memory access requests (e.g., direct memory access requests) from the I/O device 216 via IOMMU 224 and controls provision of those requests to the memory 214. In addition, the memory controller 222 receives responses to memory access requests from the memory 214 and controls provision of the responses to the I/O device 216.

To provide for cryptographic isolation of information, the memory controller 222 includes an encryption module 226 configured to encrypt and decrypt information according to a specified cryptographic standard, and based on keys 228, 230. In some embodiments, the encryption module 226 is configured to employ Advanced Encryption Standard (AES) encryption and decryption, but in other embodiments the encryption module 226 may employ other encryption/decryption techniques. Conventionally, the hypervisor 208 would interact directly with the processor 202, and therefore have access to all security keys associated with the VMs 204, 206. This would allow a malicious or flawed hypervisor to provide access to secure information of the VMs to unauthorized parties. For example, it is desirable to prevent a malicious hypervisor or VM-A from communicating with a device VF-B assigned to VM-B and telling that VF-B to perform specific malicious DMA operations into VM-B's memory. Similarly, malicious VFs could attempt to perform DMA to access information employed by other VMs/VFs for which it is not authorized. In contrast, in the example of FIG. 2, access to security keys is managed by the security module 210 and only allows VF access to authorized information, as described further herein.

The security module 210 supports the cryptographic isolation of information by generating security keys, identifying the entities registered to be executed at the processing system, and other operations that enable such cryptographic isolation. The generation of security keys can be done at the security module 210 or at a separate security device and communicated to the security module 210 via the secure communication channel 212. The security module 210 ensures that each of the VM KEY and VM TAG values are unique to the corresponding VM. The term "security key" as used herein refers to an authentication or encryption key, as well as any certificate, or certificate chain, that signs the key. The security module 210 generates and maintains two different security keys, KEY-A 228 and KEY-B 230, associated with VM-A 204 and VM-B 206, respectively. The security module 210 provides the security keys 228, 230 directly to the memory controller 222, such that the hypervisor 208 cannot access the security keys. In some embodiments, the security module 210 provides the keys by writing the keys directly to registers of the memory controller 222. These registers can be inaccessible to (e.g., not addressable by) the hypervisor 208 or other entities executing at the processor 202, thus preventing malicious entities from accessing the security keys 228, 230 and in turn accessing the secure information address spaces 232, 234.

Figure 3:
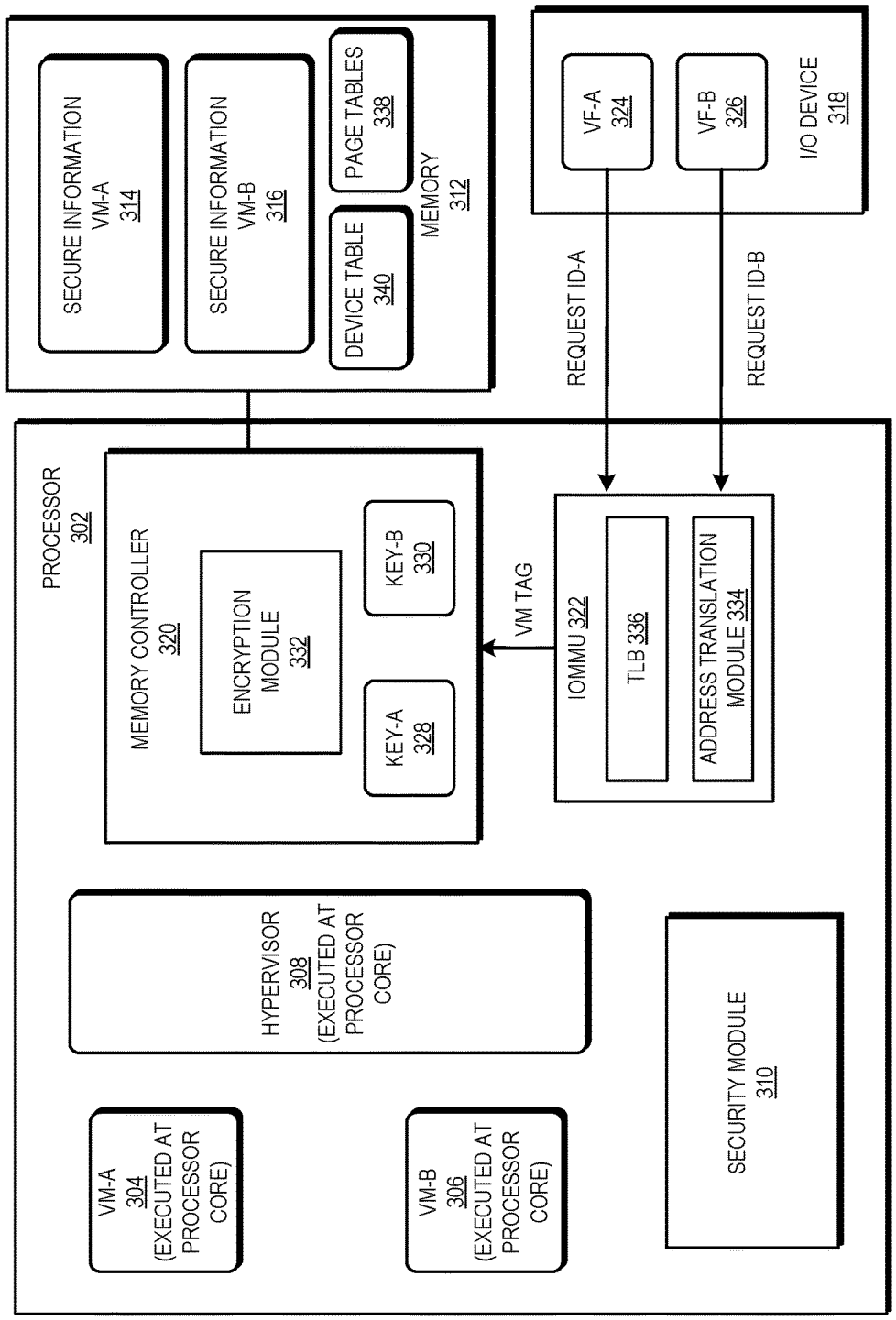
FIG. 3 is a block diagram illustrating another example implementation of the processing system of FIG. 1 to provide for isolation of information in accordance with some embodiments.

FIG. 3 illustrates a portion of FIGS. 1 and 2's processing system for performing an example direct memory access operation in accordance with some embodiments. In the depicted example, the processor 302 is to concurrently execute two virtual machines (VMs), VM-A 304 and VM-B 306. In addition, the processor 302 executes a hypervisor 308 to provide an interface between the VMs 304, 306 and the hardware of the processing system. In operation, prior to being permitted to execute at the processor 302, each of the VMs 304 and 306 register with the security module 310. The hypervisor 308 assigns each VM to a corresponding encrypted address space for the VM in memory 312. The memory 312 stores data used by the processor 302. The memory 312 can be random access memory (RAM), non-volatile memory such as flash memory or a hard disk drive (HDD), and the like, or a combination thereof. The secure information space 314 is associated with VM-A 304 and the secure information space 316 is associated with VM-B 306.

The processing system also includes a physical input/output (I/O) device 318, a memory controller 320, and an input/output memory management unit (IOMMU) 322. The physical I/O device 318 can be, for example, a network interface card (NIC), a host bus adapter (HBA), or the like. The I/O device 318 can include a plurality of virtual functions (VFs) that are configured on the device. The I/O device 318 includes two VFs, VF-A 324 and VF-B 326, that are configured on the device. The hypervisor 308 maps (e.g., assigns) the VFs 324, 326 to the VMs 304, 306. For example, VF-A 324 is mapped to VM-A 304 and VF-B 326 is mapped to VM-B 306.

As discussed above in reference to FIG. 2, the security module 310 associates the VMs with the I/O device VFs by assigning a unique identification tag value (e.g., the VM TAG) to each VF. When the processor 302 executes VM-A, it is loaded with a VM-A TAG (i.e., identification tag value) and this tag is used when accessing memory. For example, VM-A TAG is assigned to VF-A 324 and VM-B TAG is assigned to VF-B 326 by the security module 310. The security module 310 also generates and provides security keys 328 and 330 to the memory controller 320. In the example of FIG. 3, the security module 310 generates and maintains two different security keys, KEY-A 328 and KEY-B 330, associated with VM-A 304 and VM-B 306, respectively. The security module 310 provides the security keys 328, 330 directly to the memory controller 320, such that the hypervisor 308 cannot access the security keys.

This same tag is provided when accessing memory-mapped I/O (MMIO) registers in the I/O device 318. The IOMMU 322 is configured with protection tables to identify whether an MMIO request with VM-A Tag is allowed to access the requested MMIO address. In some embodiments, the IOMMU includes a lookup table (not shown) which contains MMIO apertures (e.g., portions of memory physical address space associated with the MMIO registers) along with VM accessibility. The lookup table is used to check MMIO traffic (e.g., read/writes from the VMs to MMIO of the I/O device 318) and associates VM TAGS with allowable downstream MMIO address ranges. The VM TAG is included in MMIO access requests to authorize traffic from the VMs to the I/O device 318. If a mismatch in the VM TAG value between the value provided by the VM and the value assigned to the VF, access to the I/O device 318 MMIO is prevented. This MMIO isolation prevents a malicious hypervisor from controlling a VF that has access to a VM.

In some embodiments, this downstream MMIO access authorization is performed by the IOMMU 322 but can alternatively be performed at a module separate from the IOMMU 322. This configuration provides a path from the VMs to the registers of the I/O device 318 and ensures that only VMs authorized by the security module 310 can reach the registers of their associated VFs. As used herein, the term "downstream" refers to MMIO traffic that includes read or writes from the VMs to the I/O device 318 via IOMMU 322. The term "upstream" refers to direct memory access (DMA) traffic that includes read or writes from the VFs 324,326 or I/O device 318 to memory 312 via IOMMU 322.

The IOMMU 322 is used to connect devices (such as the I/O device 318) to the memory controller 320. The memory controller 320 provides an interface for the I/O device 318 to communicate with the memory 312. In some examples, the memory controller 320 receives memory access requests (e.g., direct memory access requests) from the I/O device 318 via IOMMU 322 and controls provision of those requests to the memory 312. In other examples, the memory controller 320 receives responses to memory access requests from the memory 312 and controls provision of the responses to the I/O device 318.

The VFs 324 and 326 at the I/O device 318 may employ the memory controller 320 to access secure information 314, 316 in the memory 312 through direct memory access (DMA) requests by initiating a memory access request. For example, in the course of their execution, the VFs 324 and 326 are to access (store and retrieve) secure information 314 and 316 respectively. The encryption module 332 ensures that the secure information 314 and 316 are cryptographically isolated, so that the data stored therein can only be encrypted/decrypted using security keys assigned to their respective VMs/VFs.

In some embodiments, the VFs 324 and 326 provide the memory access requests to the IOMMU 322, with the memory access requests including a virtual address targeted by the memory request and a requestor ID that is unique to each for each VF. For example, VF-A 324 transmits a requestor ID of "REQUEST ID-A" along with its memory access request and VF-B transmits a requestor ID of "REQUEST ID-B" along with its memory access request.

The requestor IDs can be partially controlled by I/O device hardware (e.g., device number and virtual function number) and/or by system bios firmware or the hypervisor 308 (e.g., bus number). The IOMMU 322 determines a VM TAG value based on the requestor ID of the DMA operation by looking up a VM TAG associated with the received requestor ID using a device table 340, stored at memory 312, that contains a mapping of VM TAGs to requestor IDs.

In some scenarios, a malicious entity could attempt to access the secure information for a VM by emulating (e.g., via software emulation) the IOMMU 322. To address these scenarios, in some embodiments the IOMMU 322 and the VMs 304, 306 can perform an integrity check procedure to ensure the IOMMU 322 is not being emulated. In particular, to check the integrity of the IOMMU 322, the VMs 304, 306 can write a designated command to the corresponding secure information space at the memory 312. For example, in some embodiments, the VMs 304, 306 write an IOMMU TLB invalidation command to a specified location of the corresponding secure information space when the respective VM changes page tables. The IOMMU 322 reads the command from the secure information space, executes the command (e.g., by invalidating any cached copies of the old address translations in its TLB 336), and, upon completion of the command writes a specified value to the specified location of the corresponding secure information space (that is, it overwrites the command stored at the specified location). The IOMMU writes the specified value to the memory 312 via the memory controller 320, so that the specified value is written using the corresponding encryption key for the VM that issued the command. The VM that issued the command periodically checks the specified location for the specified value. If the VM identifies an incorrect value written to the specified location, or if the command at the specified location is not overwritten within a specified amount of time, the VM determines that the entity to which the page table command was issued is not authorized, and the VM can then take remedial action. By using the secure information space to perform the integrity check, the processor 302 ensures that an unauthorized entity cannot emulate the IOMMU 322 to gain access to the secure information space. In particular, the unauthorized entity is not able to write the specified value to the memory 312 because it is not able to properly encrypt the specified value (as it is not aware of the correct encryption key).

In some embodiments, the IOMMU 322 identifies, based on one or more bits included with the virtual memory address of the request, whether the memory access request is a secure memory access request. For example, as described further below in FIGS. 4 and 5, The virtual address contains a C-bit to indicate whether the access request is secure/non-secure. If the request is non-secure, the IOMMU 322 bypasses the encryption module 332 and satisfies the memory access request without encryption or decryption.

If the request is a secure memory access request (e.g., based on the C-bit being asserted), the IOMMU 322 looks up a VM TAG using the device table 340 based on the requestor ID (e.g., REQUEST ID-A or ID-B) provided by the VF requesting DMA (e.g., one of the VFs 324 and 326 that generated the memory access request). The identified VM TAG is provided to the encryption module 332 of the memory controller 320, which identifies which encryption key should be used with the DMA request (i.e., memory reads use the associated key to decrypt the data from memory 312. Memory writes use the associated key to encrypt the data going to memory 312). Thus, the encryption module 332 selects the one of the security keys 328 and 330 corresponding to the VM TAG output from the IOMMU and performs encryption (in the case of a write request) or decryption (in the case of a read request) on the memory access information (the read data or the write data) using the selected key.

The IOMMU 322 also looks up page table information (in page tables 338) associated with the I/O device 318 to be used for address translation. The IOMMU 322 includes an address translation module 334 and a translation lookaside buffer (TLB) 336 for performing address translation between device virtual addresses used by the I/O device 318 and physical addresses in the memory 312. The IOMMU 322 utilizes the TLB 336 and page tables 338 in memory 312 to obtain a physical address for a specific page of memory being targeted by the memory access request. The page tables 338 map virtual addresses to physical addresses. The physical address is used by the memory controller 320 in order to access the page of memory. In some embodiments, the physical address, which is derived after IOMMU address translation, may have its upper bits repurposed to encode VM TAGs for transfer to the encryption module 332. In other embodiments, the VM TAG may also be sent separately from the physical address.

The IOMMU 322 looks up the VM TAG based on the requester ID and forwards the physical address targeted by DMA request to the memory controller 320. In some embodiments, the physical address, which is derived after IOMMU address translation, may have its upper bits repurposed to encode VM TAGs for transfer to the encryption module 332. In other embodiments, the VM TAG may also be sent separately from the physical address. When the memory controller receives the request, it looks up the encryption key based on the VM TAG and then encrypts/decrypts the memory using the encryption module. This allows VFs running on I/O device 318 to directly access the encrypted memory regions of memory 312 by referencing the same encryption keys (e.g., KEY-A 328 and KEY-B 330) as their associated VMs, and does not require interaction with VMs 304, 306 and hypervisor 308. As described above, cryptographic protection of data takes place at the memory controller 320 and the security keys used for cryptographic protection are unknown and inaccessible to the VFs 324, 326 and the VMs 304, 306 and the hypervisor 308. This ensures that one VF cannot access the secure information for the other VMs/VFs.

DMA requests are generally passed through to the memory controller 320 but may or may not have the proper VM TAG (based on the requestor ID value provided with the DMA request and used by the device table 340 to look up VM TAGs), and thus memory access may occur using either the proper cryptographic key or the wrong cryptographic key. For example, if the VM TAG associated with the requestor ID provided by the requestor VF matches the correct security key, the memory access request is forwarded with the appropriate security key to the encryption module 332 for encrypting/decrypting memory traffic, thus allowing the requestor VF to access the secure memory space of its associated VM. However, if the VM TAG associated with the requestor ID provided by the requestor VF does not match the correct security key, physical memory in the secure memory space is still read or written, but using the wrong key for decryption/encryption. Reads using the wrong security key result in the true plaintext not being returned after decryption.

For example, in some embodiments, VF-A 324 may issue a memory access request to access secure information 316

(the secure information for VF-B 326). Because the memory access request was generated by VF-A 324, the IOMMU 322 will access the device table 340 at the memory 312 to look up and provide a VM TAG associated with VF-A 324 to the memory controller 320. A VM-A tag of VF-A 324 is provided to the memory controller 320, which uses encryption module 332 to look up the security key associated with the provided VM-A tag. The secure information 316 targeted by the memory access request is decrypted using KEY-A 328, rather than with KEY-B 330 that was originally used to encrypt the secure data. Accordingly, VF-A will not be able to meaningfully or correctly interpret the decrypted data, as it was decrypted using an incorrect key. The secure information 316 for VM-B 306/VF-B 326 is thus cryptographically isolated from access by VF-A 324.

Figure 4:
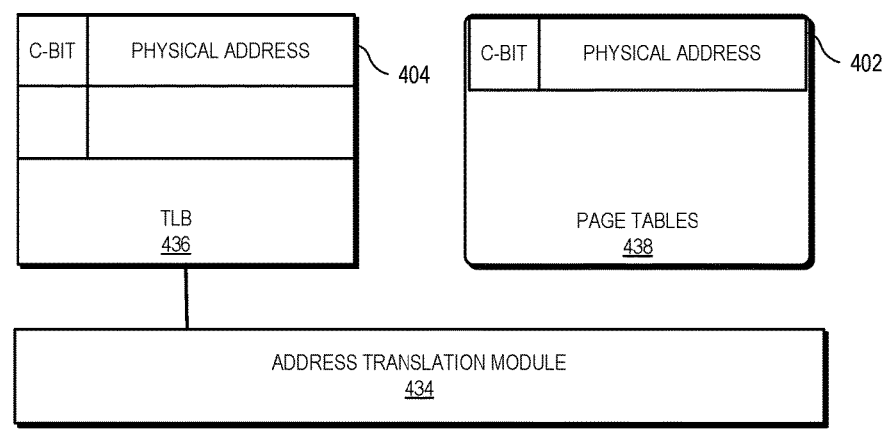
FIG. 4 is a block diagram illustrating the use of a translation lookaside buffer and page tables to identify secure memory accesses at the processing systems of FIGS. 1-3 in accordance with some embodiments.

FIG. 4 illustrates a portion of the IOMMU 322 to enable identification of a security type (e.g., secured or non-secured) for memory access requests in accordance with some embodiments. In particular, FIG. 4 depicts an address translation module 434 and a translation lookaside buffer (TLB) 436. The address translation module 434 is generally configured to receive from VFs (e.g., VF-A 324 and VF-B 326 of FIG. 3) virtual addresses for corresponding memory access requests. The address translation module 434 translates each received virtual address to a corresponding physical address that identifies the location of the memory 312 targeted by the memory access request.

The address translation module 434 employs one or both of the TLB 436 and the page tables 438 (e.g., in memory 312 of FIG. 3) to translate a virtual address to a corresponding physical address. The page tables 438 include a plurality of entries (e.g., entry 402) indexed by virtual address. In some embodiments, the page tables 438 are multi-level page tables, whereby higher-level pages include entries that identify other pages associated with the virtual address, with the lower level pages identifying the physical address assigned to the virtual address. The physical address can be identified by traversing the page tables in a page walk, wherein the highest level page is accessed first to identify the page at the next level that is to be accessed, and so on until the lowest level page table that includes the physical address is identified and the physical address retrieved from that highest level page table. The lowest level page tables also store a bit (designated the "C-bit") that indicates whether the data corresponding to the physical address is to be cryptographically protected. The TLB 436 includes a plurality of entries (e.g., entry 404) that together store a subset of the entries of the page tables 438 that reflect the virtual addresses recently received by the address translation module 434.

In response to receiving a virtual address, the address translation module 434 accesses the TLB 436 to determine whether it includes an entry corresponding to the virtual address. The C-bit portion of the address is used by the IOMMU 322 to identify whether the memory access request is a secured memory access request. Thus, for example, if the C-bit in the physical address value is in an asserted state, the memory IOMMU 322 identifies the corresponding memory access request as a secured memory access request, and the IOMMU 322 looks up the VM TAG corresponding to the requestor. The address translation module 434 appends the VM TAG value to the physical address and provides the resulting physical address value to be used by the encryption module to look up security keys. If the C-bit in the page table entry is deasserted, the IOMMU 322 does not append the VM TAG to the physical address, and memory access proceeds without encryption or decryption.

Figure 5:
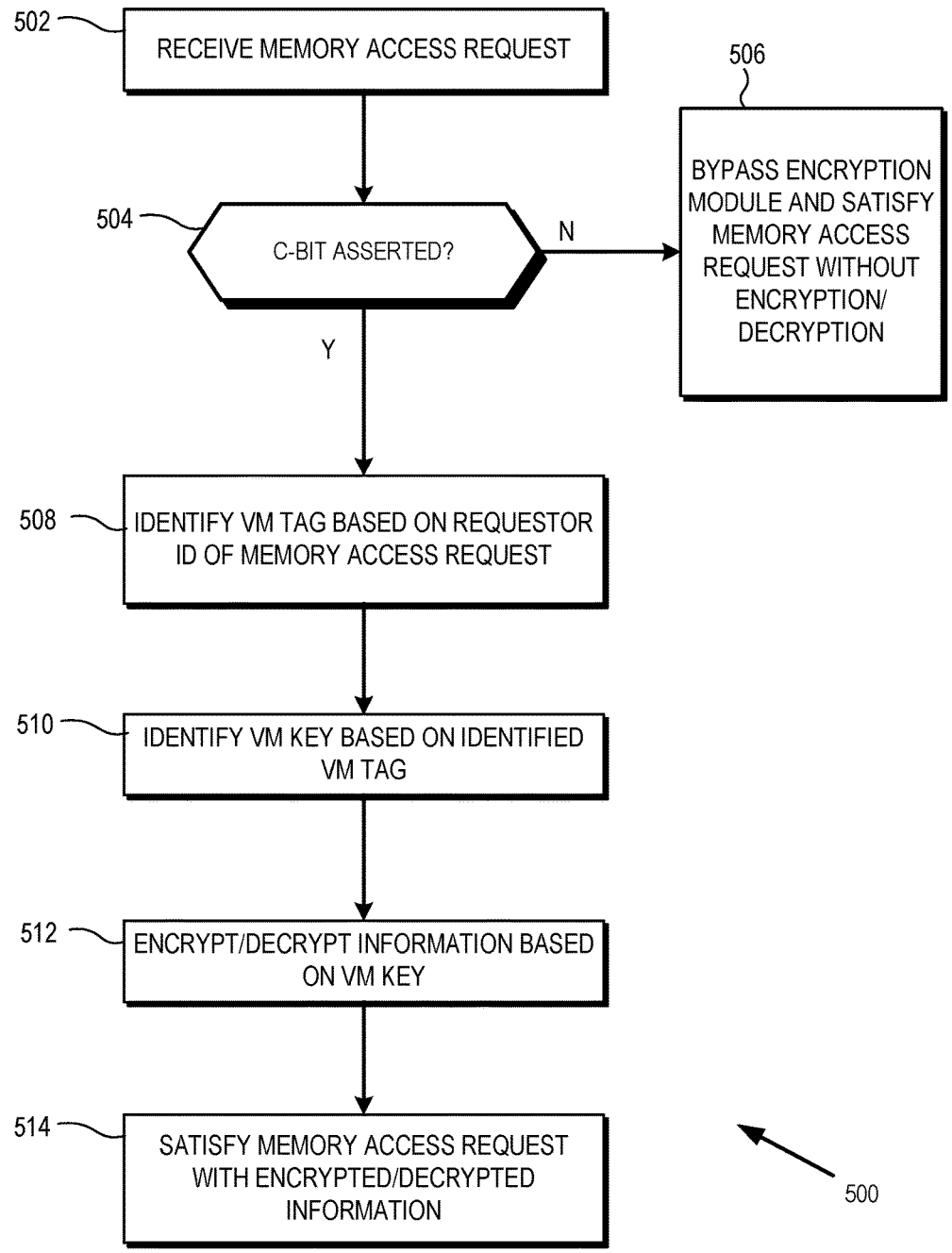
FIG. 5 is a flow diagram of a method of processing memory access requests at the processing systems of FIGS. 1-3 to protect cryptographically protected information in accordance with some embodiments.

FIG. 5 illustrates a flow diagram of a method 500 of processing direct memory access requests at a memory controller to protect information designated for cryptographic protection in accordance with some embodiments. For purposes of description, the method 500 is described with respect to an example implementation at the IOMMU 322 of FIG. 3. At block 502, the IOMMU 322 receives a memory access request from a requestor VF. The memory access request may be a request generated by one of the VFs 324 or 326. As described above with respect to FIGS. 1-4, the address value for the memory access request may include a C-bit value indicating whether the memory access request is a secure memory access request, and a requestor ID value identifying the requestor VF.

At block 504, the IOMMU 322 determines whether the C-bit for the memory access request is asserted. If not, the memory access request is a non-secure memory access request, and the method flow moves to block 506 and the memory controller 320 bypasses the encryption module 332 and satisfies the memory access request. In the case of a write request, the memory controller 320 does not encrypt the write information, so that the memory 312 stores the write information in unencrypted form. In the case of a read request, the memory controller 320 retrieves the information from the memory 312 and provides it to the requestor VF without decrypting the information.

Returning to block 504, if the IOMMU 322 identifies that the C-bit for the memory access request is asserted, then the memory access request is a secure memory access request. Accordingly, the method flow moves to block 508 and IOMMU 322 looks up a VM TAG based on the requestor VF's requestor ID, using device table 340 described in FIG. 3. The VM TAG is provided to the memory controller 320 and the method flow proceeds to block 510. At block 510, the memory controller 320 identifies one of the security keys 328 and 330 corresponding to the provided VM TAG. At block 512, the encryption module 332 encrypts or decrypts the information to be used to satisfy the memory access request. That is, if the memory access request is a write request, the encryption module 332 encrypts the information to be written using the identified security key. If the memory access request is a read request, the memory controller 320 retrieves the information to be read from the memory 312 and the encryption module 332 decrypts the retrieved information using the identified security key. At block 514, the memory controller 320 satisfies the memory access request using the encrypted (in the case of a write request) or decrypted (in the case of a read request) information.

In some embodiments, the apparatus and techniques described above are implemented in a system having one or more integrated circuit (IC) devices (also referred to as integrated circuit packages or microchips), such as the processor described above with reference to FIGS. 1-5. Electronic design automation (EDA) and computer aided design (CAD) software tools may be used in the design and fabrication of these IC devices. These design tools typically are represented as one or more software programs. The one or more software programs include code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a non-transitory computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method, comprising:
receiving, at an input/output memory management unit (IOMMU) of a processor, a direct memory access request from an input/output (IO) device to access a memory space within memory, wherein the direct memory access request comprises a memory address value and a requestor ID, wherein the IOMMU provides an interface between the IO device and a memory controller implemented using at least one hardware processor;
in response to the direct memory access request determining, at the IOMMU, an identification tag value associated with the requestor ID and providing the identification tag value to the memory controller; and
accessing, at the memory controller, data at the memory address value of the memory space using a security key corresponding to the identification tag value.

2. The method of claim 1, wherein receiving the direct memory access request from the IO device comprises receiving the direct memory access request from a virtual function (VF) configured on the IO device.

3. The method of claim 1, wherein determining the identification tag value comprises using a device table to look up the identification tag value based on the requestor ID.

4. The method of claim 1, further comprising:
identifying a virtual machine (VM) associated with the direct memory access request, wherein the security key corresponds to the identified VM.

5. The method of claim 4, further comprising:
receiving the security key from a security module separate from the processor.

6. The method of claim 1, further comprising:
in response to determining that the direct memory access request is to access data at the memory address value of a non-secure memory space, accessing data at the non-secure memory space without using the security key.

7. The method of claim 1, further comprising:
in response to determining that the direct memory access request is a write access request to access data at the memory address value of a secure memory space, encrypting data for writing to the secure memory space using the security key.

8. The method of claim 1, further comprising:
in response to determining that the direct memory access request is a read access request authorized to access data at the memory address value of a secure memory space, decrypting data read from the secure memory space using the security key.

9. The method of claim 1, further comprising:
in response to receiving a request at the IOMMU to access a memory-mapped I/O (MMIO) register, allowing access to the MMIO register based on the identification tag value.

10. The method of claim 1, further comprising:
writing a command from a virtual machine to a secure memory space;
executing the command at the IOMMU in response to the command;
overwriting, by the IOMMU, the command at the memory space with a specified value in response to executing the command; and
the virtual machine authenticating the IOMMU in response to reading the specified value at the secure memory space.

11. A processor, comprising:
an input/output memory management unit (IOMMU) to receive a direct memory access request from an input/output (IO) device to access a memory space within memory and to determine an identification tag value associated with the direct memory access request; and
a memory controller, implemented using at least one hardware processor, to receive the identification tag value form the IOMMU, the memory controller comprising an encryption module to provide cryptographic access to data within the memory space based on the identification tag value.

12. The processor of claim 11, wherein:
the identification tag value is determined based on a requestor ID included with the direct memory access request.

13. The processor of claim 12, further comprising:
a device table to determine the identification tag value, based on the requestor ID, to be passed to the encryption module.

14. The processor of claim 12, further comprising:
a hypervisor to associate the requestor ID with the identification tag value.

15. A processor, comprising:
a processor core;
an input/output memory management unit (IOMMU) to:
   receive a direct memory access request from an input/output (IO) device to access a secure memory space within memory associated with a virtual machine (VM), wherein the direct memory access request comprises a memory address value and a requestor ID indicative of the VM; and
   determine an identification tag value associated with the requestor ID; and
a memory controller, implemented using at least one hardware processor, to receive the identification tag value form the IOMMU and to access data at the memory address value of the secure memory space using a security key corresponding to the identification tag value.

16. The processor of claim 15, wherein the processor further comprises:
a security module separate from the processor core to store the security key.

17. The processor of claim 16, wherein the security module is to:
generate the security key in response to a request from the VM.

18. The processor of claim 17, wherein:
the memory controller includes an encryption module to encrypt data using the security key for writing to the secure memory space in response to determining that the direct memory access request is a write access request authorized to access data at the memory address value of the secure memory space.

19. The processor of claim 18, wherein the encryption module is to:
decrypt data read from the secure memory space using the security key in response to determining that the direct memory access request is a read access request authorized to access data at the memory address value of the secure memory space.

20. The processor of claim 15, wherein the direct memory access request is requested by a virtual function (VF) configured on the IO device.

* * * * *